Sept. 1, 1931.    F. A. HAYES    1,821,833
VARIABLE SPEED POWER TRANSMISSION MECHANISM
Filed June 26, 1930    3 Sheets-Sheet 1

INVENTOR
F. A. Hayes
BY ATTORNEYS
Cooper, Kerr & Dunham

Sept. 1, 1931.   F. A. HAYES   1,821,833
VARIABLE SPEED POWER TRANSMISSION MECHANISM
Filed June 26, 1930   3 Sheets-Sheet 3

INVENTOR
F. A. Hayes
BY ATTORNEYS
Cooper, Kerr & Dunham

Patented Sept. 1, 1931

1,821,833

UNITED STATES PATENT OFFICE

FRANK A. HAYES, OF MIDDLETOWN, NEW JERSEY

VARIABLE SPEED POWER TRANSMISSION MECHANISM

Application filed June 26, 1930. Serial No. 463,876.

This invention relates to variable speed friction transmission mechanisms of the type having toroidally grooved coaxial disks cooperating with interposed friction rollers, planetary or non-planetary, mounted in carriers which are arranged to rock on axes perpendicular to the roller axes for the purpose of varying the speed-ratio of the mechanism. Three methods have been proposed for producing the desired rocking movement or adjustment of the rollers. In one method the rollers and carriers are forcibly rocked on their carrier axes against the frictional resistance of the disks. In another method the carriers are shifted by tilting them in the plane of their axes, which plane is parallel to the planes of the disks, thereby causing the frictional forces impressed upon the rollers by the disks to give the rollers and carriers a rocking or "precessional" movement on the carrier axes. In the third method, described and claimed broadly in my prior Patent No. 1,698,229, issued January 8, 1929, the carriers and rollers (the axes of which normally intersect the disk axis) are shifted by displacing them along the carrier axes and are thus caused to precess on the latter axes but at the same time are caused to return automatically to the equilibrium position, in which the roller axes again intersect the axis of the disks.

The present invention relates to the means for producing the rocking movement of the carriers, and its chief object is to provide simple and effective mechanism for actuating or controlling the roller carriers. Another object is to provide carrier actuating or control mechanism by which the rocking movement or adjustment can be effected by any of the three methods stated, depending upon the way in which the carriers themselves are mounted. A further object is to provide carrier actuating or control mechanism which, when used with carriers mounted for precessional movement, serves also to return the carriers and rollers to the equilibrium position. To these and other ends the invention comprises the novel features and combinations hereinafter described.

In carrying out my invention in the preferred manner I provide between the disks a helical gear which is mounted for a limited movement of rotation in either direction about the axis of the disks, and the carriers are equipped with helical gear sectors concentric with the carrier axes and meshing with the first gear. If, then, the gear is rotated one or another of three results will follow: if the carriers are mounted to tilt on axes which are diameters of the rollers, the carriers will be tilted as indicated, thereby causing the rollers and carriers to precess; and as they precess, the helical gearing will cause the carriers to swing back to the equilibrium position. Or if the carriers are mounted for displacement along their axes of precession, such displacement will be produced, precession will ensue, and as the carriers and rollers precess they are returned by the helical gearing to the equilibrium position. In both these cases the extent of precession corresponds to the extent of the rotation of the control or actuating gear, a greater rotary movement of the gear causing greater precession, and vice versa. If, on the other hand, the carriers are not mounted for tilting or displacement but only for rocking adjustment on their axes, then the rotation of the control or actuating gear simply rocks the carriers to an extent corresponding to the rotation of the gear.

Referring to the accompanying drawings.

Figure 1:
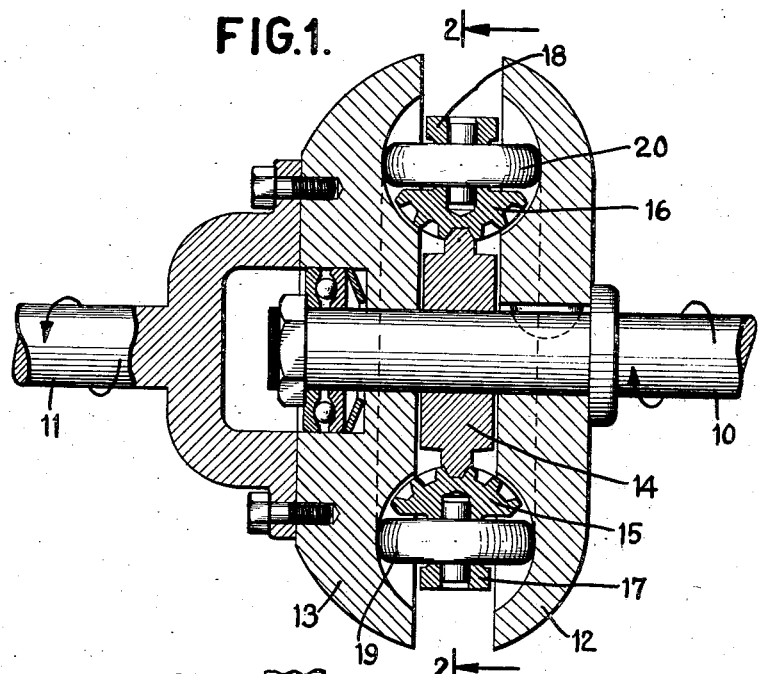
Fig. 1 is a sectional plan view on a plane containing the axis of the disks, the coaxial disks and the cooperating rollers mounted in carriers provided with helical gear sectors meshing with the helical control or actuating gear.

In the drawings, 10 and 11 are coaxial shafts either of which may be the driving shaft, for example the first, in which case disk 12 is the driving disk and is keyed on shaft 10, while disk 13 is fixed to the driven shaft 11.

Figure 5:
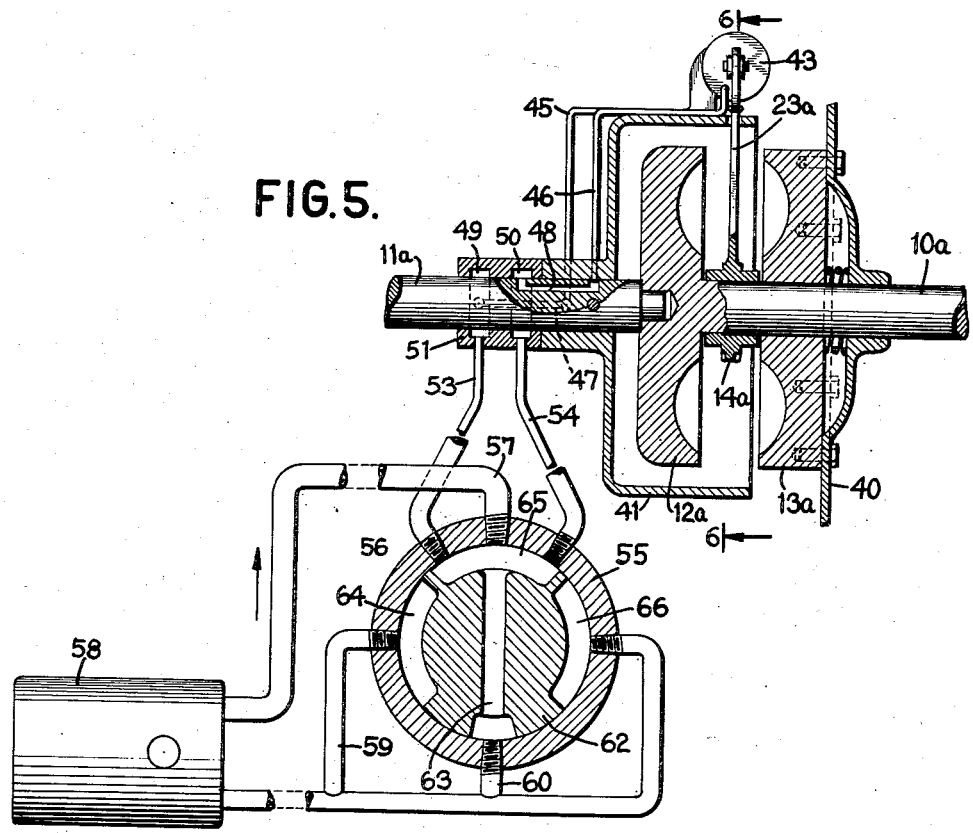

Fig. 5 is a cross section illustrating a construction in which the friction rollers are of the planetary type.

Figure 6:
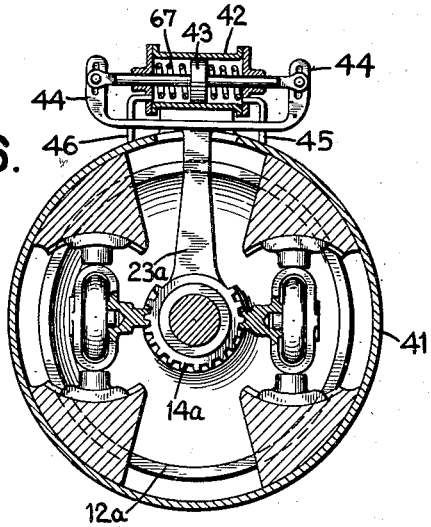

Fig. 6 is a section on line 6—6 of Fig. 5.

Figure 2:
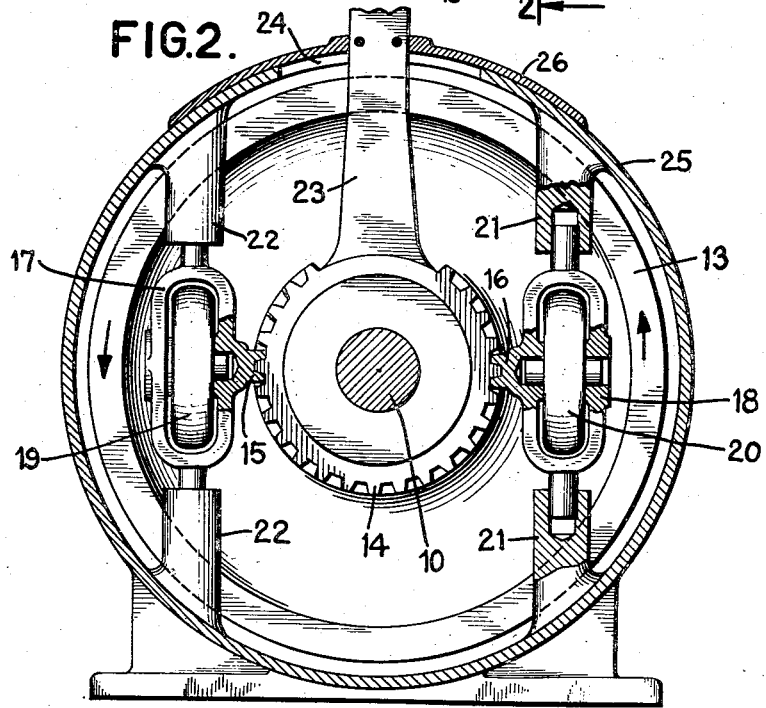
Fig. 2 is a cross section on line 2—2 of Fig. 1, showing the rollers journaled in carriers mounted for displacement along axes transverse to their axes of rotation.

Between the disks is a helical gear 14, rotatable to a limited extent in each direction on the shaft 10, and meshing with the helical gear sectors 15, 16, on the carriers 17, 18, in which the rollers 19, 20 are mounted. In the construction shown in Fig. 2 the carriers are journaled in bearings 21, 22 in which the carriers are also capable of slight axial movement.

Attached to the gear 14 is a control arm 23, which extends radially out through a circumferential slot 24 in the housing 25 so that the arm may be swung in either direction. A sliding cover-plate 26, attached to the arm, keeps the slot closed as the arm is shifted.

Assuming that the gear teeth are left-hand helixes and that the driving shaft 10 and disk 12, Fig. 1, are rotating in the direction of the arrow on the shaft, it will be seen that if the control arm 23 is moved to the right (clockwise) the control gear will tend to rock the carrier 17 (Fig. 2) on the axis of its journals. The frictional resistance encounter, by the roller prevent such motion, however, and hence the carrier is raised in its bearings, causing the roller and carrier to precess (counterclockwise in Fig. 1) toward a lower speed-ratio position, as explained in my prior patent above referred to. As the carrier precesses, however, the inclination of the helical gear teeth causes the carrier and roller to descend, and the precession and downward movement cease as soon as equilibrium position is reached, that is, the position at which the axis of the roller (on which the roller rotates) again intersects the axis of the disk. At the same time, the counterclockwise movement of the control or gear-actuating arm depresses carrier 18 in its bearings, causing the carrier and roller to precess in the clockwise direction (Fig. 1) and as the carrier precesses it rises to the equilibrium position, where further rise and precession cease. Similarly, if the arm 23 is rocked counterclockwise roller 19 is depressed and precesses clockwise, and roller 20 is raised and precesses counterclockwise, thus shifting the rollers to a higher speed ratio position, with automatic restoration to equilibrium position.

Figure 3:
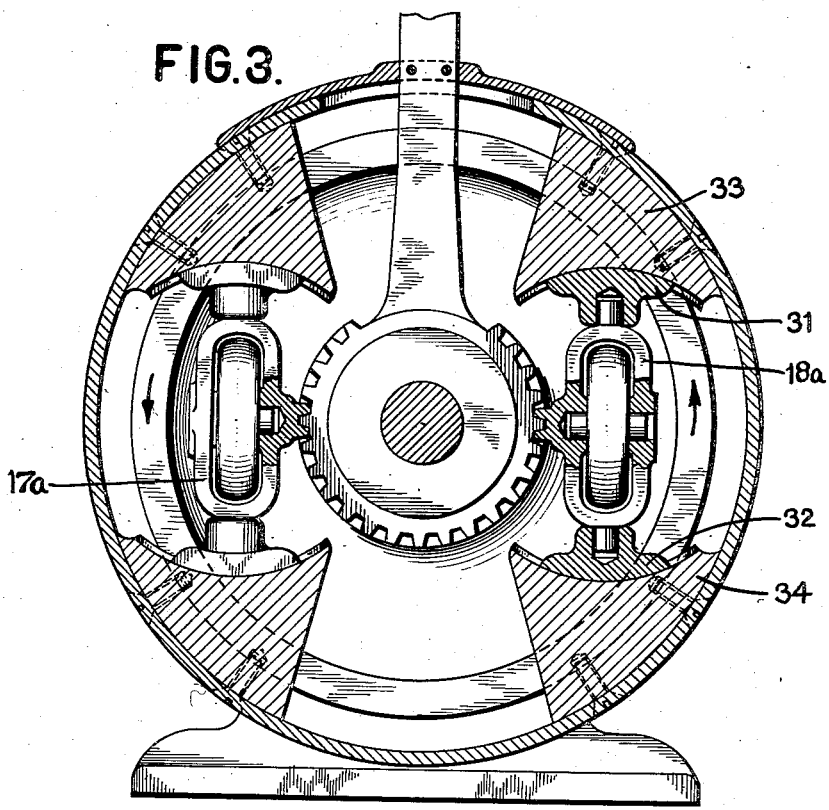
Fig. 3 is a similar section, showing the rollers in carriers mounted for tilting in a plane parallel to the planes of the disks.

In the construction shown in Fig. 3 no movement of the carriers 17a, 18a, along their axes is permitted but instead their bearings 31, 32 are slidably mounted in arc-shaped guides 33, 34, concentric with the centers of the respective rollers. In this case counter- clockwise movement of the arm 23 tilts both the carriers 17a and 18a clockwise, on axes which are diameters of the rollers through the points of contact on the disks. Carrier 17a then precesses clockwise (Fig. 1) and the other precesses counterclockwise, both returning to equilibrium by the effect of the helical gear teeth. The opposite movements take place when the control arm is shifted clockwise.

Figure 4:
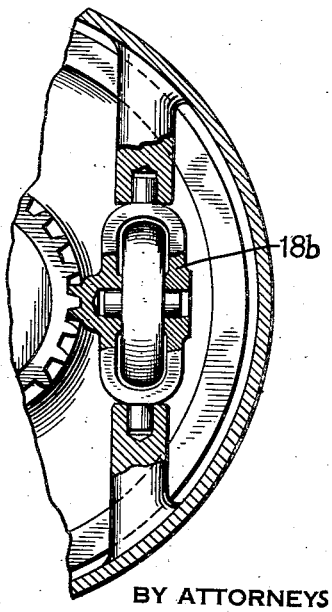
Fig. 4 is a detail cross section showing the mounting of the carriers for speed-varying adjustment without precession.

In the construction shown in Fig. 4 the carrier 17b can neither tilt nor move in line with its axis. Hence actuation of the control arm (not shown in Fig. 4) will rock the carrier 17b on its axis, the other carrier (not shown) being rocked simultaneously in the direction opposite to the first, to a higher or lower speed ratio position, as the case may be. In this case also, the extent of the rocking adjustment of the rollers corresponds to the extent of movement of the control arm.

If desired the rollers may be of the planetary type, and one form of construction for that purpose is illustrated in Figs. 5 and 6. In this arrangement the driving disk 12a is fixed to the driving shaft 10a which rotates in disk 13a, which latter is made non-rotating in any convenient way as by fastening it to the transmission casing 40. On the driven shaft 11a is pinned a driving drum 41, which overhangs the disk 12a and carries the bearings of the roller carriers. The roller mountings shown in Fig. 6 are of the type illustrated in Fig. 3, but they may be of any other type. It will be seen that with disk 13a stationary the rollers must revolve in planetary fashion, carrying the drum with them and thus rotating the driven shaft 11a.

On the drum is a hydraulic cylinder 42 having a piston 43 mounted on rods connected to the forks 44 of the control arm 23a. The cylinder is connected at its ends by pipes 45, 46 to the hub of the drum 41, where the pipes communicate with one end of passages 47, 48 in the driven shaft 11a. At their other ends these passages open into inner circumferential grooves 49, 50 in a stationary sleeve 51, in which the shaft rotates. The grooves are connected by pipes 53, 54 to the casing 55 of a six-way valve 56 by which the supply of liquid under pressure to the cylinder 42 is controlled. The valve is connected by pipe 57 to a suitable pump (not shown) in a vessel 58, so that liquid under pressure can be delivered to either side of the piston 43, as will be explained below. The valve is also connected with the vessel 58 by liquid-return pipes 59, 60, 61.

When the valve member or plug 62 is in its central or neutral position, Fig. 5, the liquid coming from the supply pipe 57 flows idly through valve passage 63 and 60 back to vessel 58. When the plug is turned clockwise, valve passage 64 is gradually brought into communication with pipe 53 so that any liquid trapped in the cylinder to the right (Fig. 6) of the piston can escape by way of pipe 45, passage 47 in the shaft 11a, groove 49, pipe 53, valve passage 64, and pipe 59, to the vessel 58. At the same time the orifice of pipe 60 is gradually restricted, with the result that more liquid flows by way of valve passage 65, pipe 54, groove 50, passage 48 and pipe 46 to the left end (Fig. 5) of cylinder 42, thus building up pressure therein and shifting piston 43 rightwardly, which rocks the control arm 23a and the helical gear 14a clockwise. It will be understood that this movement of the control arm will continue until a balance is reached between the flow of liquid through pipe 54 to the cylinder and through pipe 60 to the vessel 58. If the valve is turned counterclockwise the opposite effect is produced, as will be readily understood, liquid being then delivered through pipe 53, valve passage 64 and pipe 45 to the right hand end of the cylinder, thus rocking the helical gear 14a counterclockwise, liquid escaping from the left side of the piston through pipe 46, valve passage 66 and pipe 61 to the vessel 58. In either case, as the valve is returned to its neutral position the centralizing springs 67 return the piston and control arm (and with the latter the control gear 14a) to central position.

It is to be understood that the invention is not confined to the specific embodiments herein described but can be carried out in other ways without departure from its spirit.

I claim:—

1. In a transmission mechanism, in combination, coaxial friction disks having toroidal grooves in their opposed faces, friction rollers between the disks, cooperating with the grooves in said disks, carriers for the rollers, mounted for adjustment on axes transverse to the axes of the rollers to vary the speed ratio of the mechanism, a gear coaxial with the disks and rotatable independently thereof, and means carried by the roller carriers and cooperating with the said gear to produce speed-varying adjustment of the carriers when the gear is rotated.

2. In a transmission mechanism, in combination, coaxial friction disks having toroidal grooves in their opposed faces, friction rollers cooperating with the grooves, carriers for the rollers, mounted for adjustment on axes transverse to their axes of rotation to vary the speed ratio of the mechanism, helical gear sectors connected with the carriers and concentric with the axes thereof, a helical gear meshing with the said gear sectors, and means for rotating the gear to produce said speed varying adjustment.

3. In a transmission mechanism, in combination, coaxial friction disks having toroidal grooves in their opposed faces, friction rollers cooperating with the grooves in the disks and mounted for precession to vary the speed of the mechanism, and helical gear means for shifting the rollers to cause precession thereof.

4. In a transmission mechanism, in combination, a shaft, friction disks coaxial with the shaft and having toroidal grooves in their opposed faces, roller carriers arranged between the disks and mounted for rocking adjustment on longitudinal axes, friction rollers journaled in the carriers and cooperating with the grooves in said disks, a helical gear rotatably mounted on said shaft between the disks, means for rotating the gear, and helical gear sectors carried by the carriers and meshing with the helical gear.

5. In a transmission mechanism, in combination, coaxial friction disks having toroidal grooves in their opposed faces, friction rollers cooperating with the grooves and capable of rocking to vary the speed ratio of the mechanism, the rollers being mounted for displacement of their axes in planes transverse to their planes of rocking, and helical gear means connected with the rollers for displacing the axes of the latter to produce speed-varying rocking of the rollers by precession.

6. In a transmission mechanism, in combination, coaxial friction disks having toroidal grooves in their opposed faces, friction rollers cooperating with the grooves, carriers for the rollers, mounted for rocking with the latter to vary the speed ratio of the mechanism and for being displaced in planes transverse to their planes of rocking, and means for displacing the carriers, comprising a controlling gear coaxial with the disks and rotatable independently thereof and gear means associated with the carriers and engageable with the controlling gear, the said gear means being adapted to permit speed-varying rocking of the carriers by precession of the rollers on displacement of the carriers by movement of the controlling gear.

7. In a transmission mechanism, in combination, coaxial friction disks having toroidal grooves in their opposed faces, friction rollers cooperating with the grooves and mounted for shifting in a direction transverse to their axes, the rollers being capable of rocking to vary the speed ratio of the mechanism, and helical gear means connected with the rollers for shifting the rollers to produce speed-varying rocking of the latter by precession.

8. In a transmission mechanism, in combination, coaxial friction disks having toroidal grooves in their opposed faces, a transmission member rotatable about the axis of the disks and carrying friction rollers disposed for cooperation with the grooves of the disks, said rollers being mounted for adjustment on axes transverse to their axes of rotation to vary the speed ratio of the mechanism, a gear coaxially associated with the transmission member and rotatable independently thereof, means associated with the rollers and cooperating with the said gear to produce speed-varying adjustment of the rollers when the gear is rotated, and gear-rotating means for controlling operation of said gear independently of the rotation of the transmission member.

9. In a transmission mechanism, in combination, coaxial friction disks having toroidal grooves in their opposed faces, a transmission member rotatable about the axis of the disks and carrying friction rollers disposed for cooperation with the grooves of the disks, said rollers being mounted for precession to vary the speed of the mechanism, helical gear means associated with the transmission member for shifting the rollers to cause precession thereof, a control member associated with the gear means and displaceable to operate the latter, and controlling means for displacing the control member, said controlling means being operable independently of the rotation of the transmission member.

10. In a transmission mechanism, in combination, coaxial friction disks having toroidal grooves in their opposed faces, a transmission member rotatable about the axis of the disks and carrying friction rollers disposed for cooperation with the grooves of the disks, said rollers being mounted for adjustment on axes transverse to their axes of rotation to vary the speed ratio of the mechanism, helical gear sectors associated with rollers and concentric with their axes of adjustment, a helical gear meshing with the said gear sectors, a control member connected to said gear and displaceable to rotate the latter for producing said speed varying adjustment, a hydraulic cylinder associated with the transmission member and operable to displace said control member, liquid-transmitting conduits for connecting the cylinder to a source of liquid under pressure to operate the same, and valve means associated with said conduits for controlling the supply of liquid to said cylinder.

In testimony whereof I hereto affix my signature.

FRANK A. HAYES.